United States Patent [19]
Leung et al.

[11] Patent Number: 6,023,133
[45] Date of Patent: Feb. 8, 2000

[54] PARABOLIC SIGNAL GENERATOR

[75] Inventors: Leonard Hon Yan Leung, Homantin; Kwong Nam Chan; Kwok Ban Nip, both of Kowloon, all of The Hong Kong Special Administrative Region of the People's Republic of China

[73] Assignee: Motorola, Inc., Schaumburg, Ill.

[21] Appl. No.: 09/044,772

[22] Filed: Mar. 20, 1998

[51] Int. Cl.[7] .............................. G09G 1/04; H01J 29/56; H01J 29/58

[52] U.S. Cl. ............................. 315/368.21; 315/368.17; 315/368.18; 315/371

[58] Field of Search ...................... 315/368.12, 368.17, 315/368.18, 368.21, 368.23, 371, 382, 382.1; 327/125, 136

[56] References Cited

U.S. PATENT DOCUMENTS

| | | | |
|---|---|---|---|
| 4,121,164 | 10/1978 | Feucht ........................................ | 327/136 |
| 4,683,405 | 7/1987 | Truskalo et al. ..................... | 315/368.23 |
| 5,283,476 | 2/1994 | Wakabayashi ........................... | 327/125 |
| 5,502,410 | 3/1996 | Dunn et al. .............................. | 327/140 |
| 5,656,895 | 8/1997 | Tateishi .................................... | 315/382 |
| 5,831,400 | 11/1998 | Kim ...................................... | 315/382.1 |

Primary Examiner—Edward P. Westin
Assistant Examiner—Nikita Wells
Attorney, Agent, or Firm—Rennie W. Dover

[57] ABSTRACT

A parabolic signal generator (100) for use in a cathode ray tube (CRT) display circuit, comprising: programmable delay means (110) for receiving a CRT horizontal flyback signal and for producing a trigger signal which is delayed relative to the horizontal flyback signal by a programmable predetermined time; ramp generating means (130, 140) coupled to receive the trigger signal from the programmable delay means for producing a symmetric ramp signal in response to the trigger signal; and parabola generating means (150) coupled to receive the ramp signal from the ramp generating means for producing the parabolic signal. Since the trigger signal delay is programmable, it can be adjusted to match the delay of a range of external components. Since the ramp signal is symmetric it does not require the use of complex blanking circuitry to suppress spuriae.

12 Claims, 3 Drawing Sheets

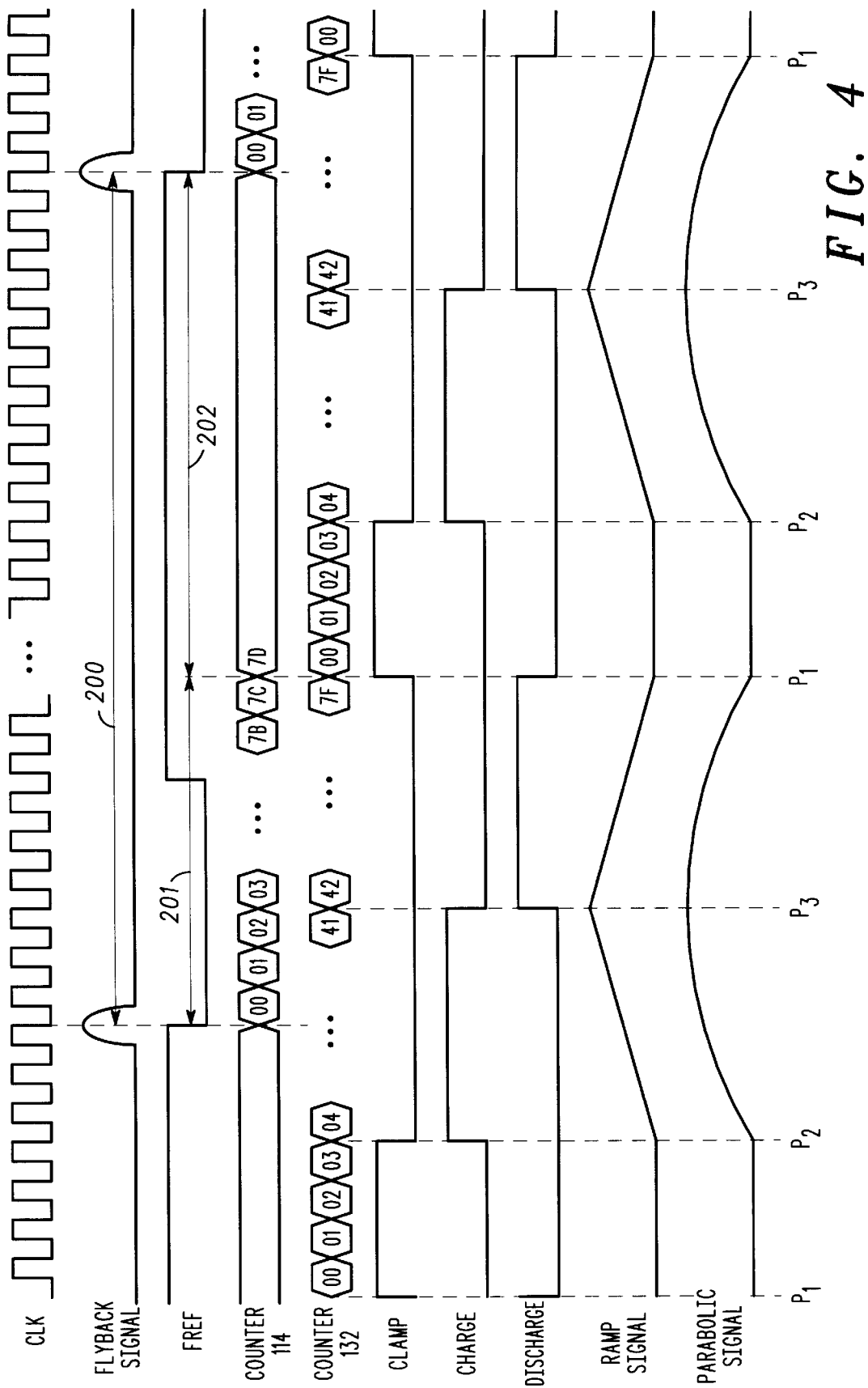

PARABOLIC SIGNAL GENERATOR

FIELD OF THE INVENTION

This invention relates to a parabolic signal generator for use in a cathode ray tube (CRT) display circuit.

BACKGROUND OF THE INVENTION

In a CRT display, it is necessary to produce a parabolic signal for use in the display's horizontal focus circuitry. As display scanning frequencies increase and screen sizes increase, it becomes particularly important for the parabolic signal to be free of spuriae and other harmful effects in order to produce sharp scanning lines in the raster and small details in the displayed picture.

In a known integrated circuit device for driving a CRT display, a parabolic waveform is generated by use of a circuit using a ramp generator, a parabola generator (typically a squaring circuit), a buffering circuit and a blanking circuit. The use of this large number of circuits increases the IC's size and design complexity and impacts its quality of operation.

Also, in this known integrated circuit device the parabolic waveform is produced having a fixed delay relative to a horizontal flyback pulse. This fixed delay requires the use of accompanying external circuitry which has a complementary delay so that the total delay from both the integrated circuit and the external circuitry is equal to one period of the horizontal flyback signal.

It is an object of this invention to provide a parabolic signal generator for use in a cathode ray tube (CRT) display circuit in which one or more of the above disadvantages may be overcome or at least alleviated.

BRIEF SUMMARY OF THE INVENTION

In accordance with a first aspect of the present invention there is provided a parabolic signal generator for use in a cathode ray tube (CRT) display circuit, as claimed in claim 1.

In accordance with a second aspect of the present invention there is provided a parabolic signal generator for use in a cathode ray tube (CRT) display circuit, as claimed in claim 2.

BRIEF DESCRIPTION OF THE DRAWINGS

One embodiment of the invention will now be more fully described, by way of example only, with reference to the accompanying drawings, in which:

FIG. 4 shows a timing diagram of various signals occurring in use of the circuits of FIG. 2 and FIG. 3.

DETAILED DESCRIPTION OF THE DRAWINGS

Figure 1:
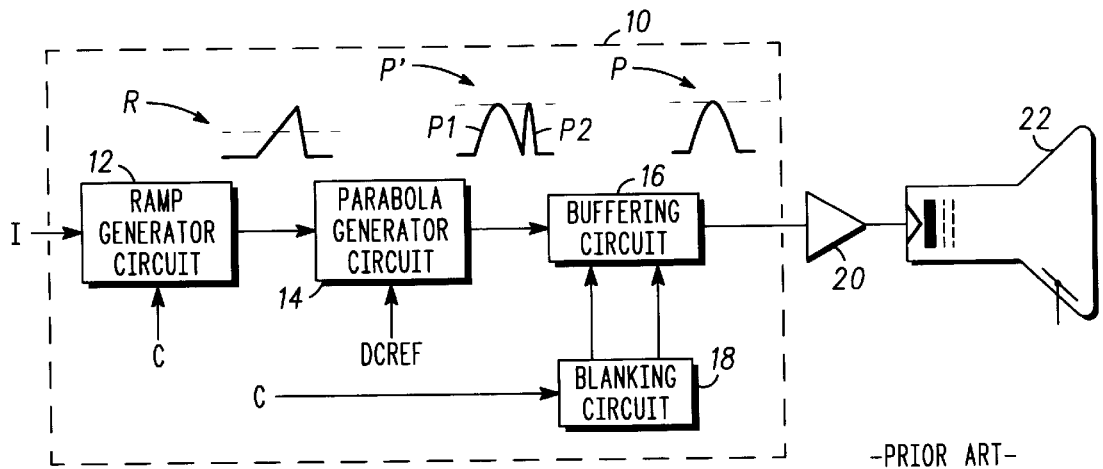
FIG. 1 shows a block diagram of a typical prior art parabolic signal generator circuit in a CRT display system.

Referring firstly to FIG. 1, in a typical prior art CRT display system a parabolic signal generator circuit 10 (which is typically in an integrated circuit device) includes a ramp generator circuit 12, a parabola generator circuit 14, a buffering circuit 16 and a blanking circuit 18. The parabolic signal generator circuit 10 receives an input reference current I and clamping pulse signal C (derived from the CRT's horizontal flyback pulse), and produces an asymmetric ramp signal R. When the signal C is low, the ramp signal increases until the signal C goes high; the signal R then decreases until a lower clamping level is reached; then, when the signal C next goes low, the ramp signal R next increases. The parabola generator circuit 14 receives the ramp signal R and a DC reference signal DCREF, and produces a parabola signal P' having both a desired primary parabola P1 and an undesired secondary parabola P2. The blanking circuit 18 receives the clamping signal C and produces control signals which are applied to the buffer circuit 16. The parabola signal P' is applied to the buffer circuit 16 which, under the control of the blanking circuit 18, blanks the secondary parabola P2 within the signal P' to produce a low-voltage parabola output signal P which contains only a single parabola as desired. The low-level parabola signal P (typically in the region of 2–3 volts) is amplified to a level of typically 400–600 volts by a high-gain amplifier 20 external to the parabolic signal generator circuit 10, and this high-voltage signal is applied to a CRT display 22 to control its horizontal focusing.

It will be understood that in the CRT display system of FIG. 1 using the parabolic signal generator circuit 10 requires that delay involved in the generator circuit 10 producing the output parabolic signal P after receiving the clamping pulse signal C must be exactly complemented by the delay produced by the external high-voltage amplifier 20. Thus the external amplifier 20 must be carefully chosen or designed so that its performance exactly matches that of the parabolic signal generator circuit 10 in order for the parabola signal applied to the CRT to have the correct timing with respect to the CRT's horizontal timebase circuitry. Since the pulses of the clamping signal C repeat with a period H (at the horizontal flyback frequency), it will be understood that when in practice a parabola output in response to an input pulse is delayed by an amount D relative to a horizontal flyback pulse, this is equivalent to the parabola being pre-delayed by an amount H-D with respect to an immediately following horizontal flyback pulse, and it is this complementary pre-delay which must be exactly provided by the external amplifier. In other words, the combined delays of the parabolic signal generator circuit 10 and the external amplifier 20 must be equal to one period of the clamping pulse signal C (i.e., one period of the horizontal flyback signal).

It will also be understood that generating the output parabolic signal P as described above in the parabolic signal generator circuit 10 requires a significant amount of circuitry (in addition to the ramp generator circuit 12 and the parabola generator circuit 14) in the form of the buffering circuit 16 and the blanking circuit 18, which must be carefully designed so that the precise timing of its operation ensures that spuriae such as the secondary parabola P2 are satisfactorily suppressed without giving rise to harmful side effects such as further spuriae which may be generated around transitions imposed by the blanking circuitry.

Figure 2:
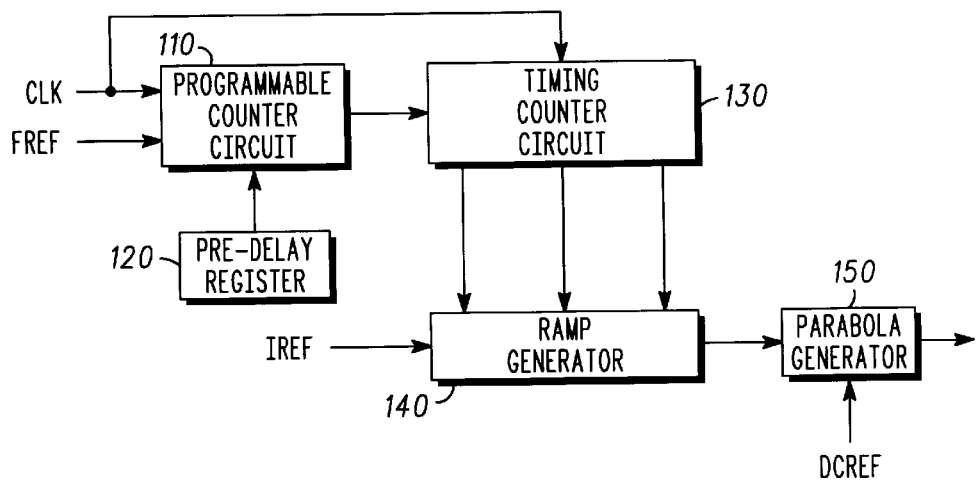
FIG. 2 shows a block diagram of a novel circuit for generating a parabolic waveform signal for use in a cathode ray tube (CRT) display circuit.

Referring now to FIG. 2, a novel parabolic signal generator circuit 100 (suitable for fabrication as, or in, an integrated circuit device) includes a programmable counter circuit 110 which receives a clock signal CLK (see FIG. 4) from an internal clock to control its rate of counting, a flyback reference signal FREF (see FIG. 4) which is derived from the CRT horizontal flyback signal (see FIG. 4) and a value from a pre-delay register 120 whose function will be described below. The content of the register 120 is programmable such that delay of the output of the counter circuit 110 with respect to the horizontal flyback signal FREF is adjustable.

A timing counter circuit 130 receives the clock signal CLK and the output of the programmable counter circuit 110, and has (as will be described below) three outputs (CLAMP, CHARGE and DISCHARGE) which are connected to a ramp generator 140. The ramp generator 140 also receives an input reference current IREF and produces an output ramp signal R. A parabola generator 150 is connected to the output of the ramp generator 140 and also receives an input DC reference signal DCREF. The parabola generator 150 produces a signal whose value is the mathematical square of the difference between the ramp signal and the DC reference signal DCREF.

Figure 3:
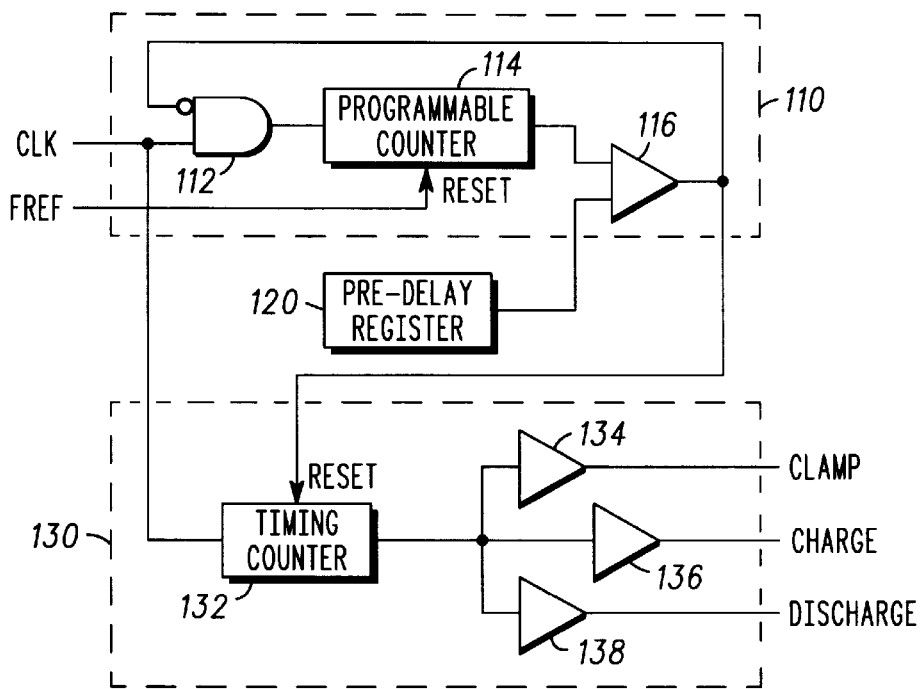
FIG. 3 shows a block diagram illustrating in greater detail a programmable counter circuit, a register and a timing counter circuit used in the circuit of FIG. 2.

Referring now also to FIG. 3, the programmable counter circuit 110 includes a disabling/enabling AND gate 112, a programmable counter 114 and a comparator 116. The timing counter circuit 130 includes a timing counter 132 and logic circuitry 134, 136 and 138 which detect (as will be described below) when the count value of the timing counter 132 reaches predetermined values.

Referring now also to FIG. 4, in use of the parabolic signal generator circuit 100, the horizontal flyback reference signal FREF (see FIG. 4) is applied to one input of the programmable counter circuit 110 and causes the programmable counter 114 to be reset to zero. The counter 114 then proceeds to count pulses of the clock signal CLK. In the present example the clock signal CLK produces 128 pulses (from hexadecimal 00 to hexadecimal 7F) in every period between consecutive horizontal flyback pulses (regardless of the display scanning frequency, illustrated by arrows 200 in FIG. 4.). The count value of the counter 114 is shown in FIG. 4. When the count value of the counter 114 reaches the value stored in the register 120 (in the present example the value hexadecimal 7C), the comparator 116 produces its output, which is applied to the timing counter circuit 130. This counting period is indicated by arrows 201 in FIG. 4. The period from count value 7C to count value 7F is indicated by arrows 202. The output of the comparator is also applied (invertedly) to the AND gate 112 to disable the programmable counter 114.

In the timing counter circuit 130, the output from the comparator 116 causes the timing counter 132 to be reset to zero. At the same time, the CLAMP signal is driven high, and the CHARGE and DISCHARGE signals are driven low. The counter 132 then proceeds to count pulses of the clock signal CLK. The count value of the counter 132 is shown in FIG. 4. While the count value of the counter 132 is not greater than a predetermined clamping value (in the present example the value 3) the logic circuitry 134 drives high the CLAMP output signal (FIG. 4. When the count value of the counter 132 exceeds the predetermined clamping value 3, the logic circuitry 134 drives low the CLAMP output signal (FIG. 4).

While the count value of the counter 132 is greater than the predetermined clamping value (3) but not greater than a predetermined charging value (in the present example the value hexadecimal 41) the logic circuitry 136 drives high the CHARGE output signal (FIG. 4). When the count value of the counter 132 exceeds the predetermined charging value hexadecimal 41, the logic circuitry 136 drives low the CHARGE output signal (FIG. 4).

When the count value of the counter 132 is greater than the predetermined charging value (hexadecimal 41) the logic circuitry 138 drives high the DISCHARGE output signal (FIG. 4). When the count value of the counter 132 exceeds its maximum count and changes from hexadecimal 7F to 0, the logic circuitry 138 drives low the DISCHARGE output signal (FIG. 4) and the logic circuitry 134 drives high the CLAMP signal (FIG. 4).

Figure 5:
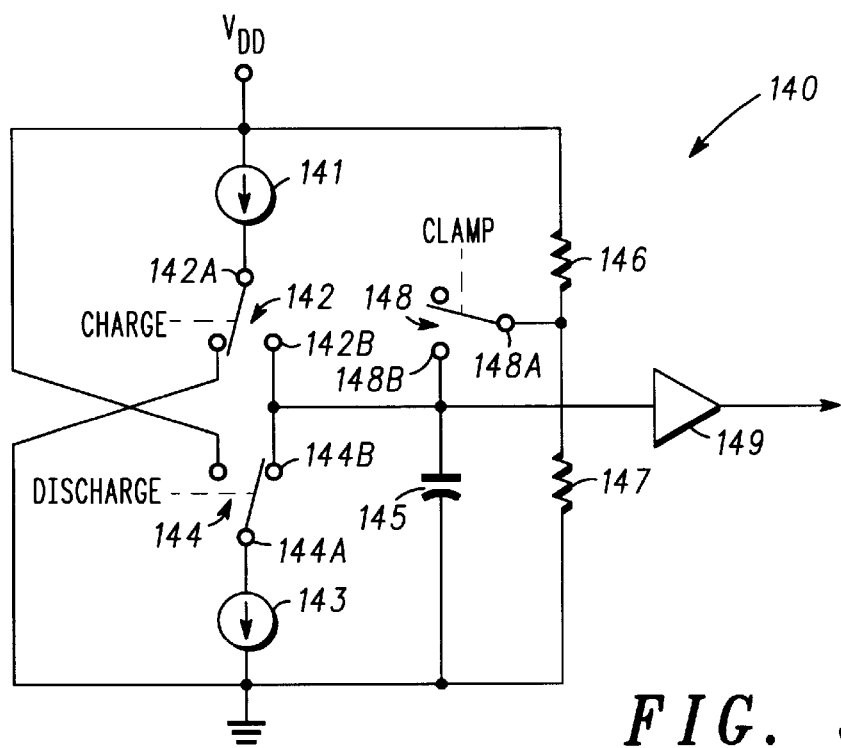
FIG. 5 shows a schematic circuit diagram of a ramp generating circuit used in the circuit of FIG. 2.

The CHARGE, DISCHARGE and CLAMP signals produced by the timing counter circuit 130 are applied to the ramp generator 140. Referring now also to FIG. 5, the ramp generator circuit 140 includes a first current source 141 coupled between a reference potential line VDD and a terminal 142A of a switch 142. A second current source 143 is coupled between ground and a terminal 144A of a switch 144. A capacitor 145 is connected between switch terminals 142B and 144B and ground. A resistor ladder formed by series-connected resistors 146 and 147 (having values in the ratio 3:2 respectively) is connected between the reference potential line VDD and ground. A switch 148 has a terminal 148A connected to a point on the resistor ladder intermediate the resistors 146 and 147, and has a terminal 148B connected to the switch terminals 142B and 144B. The switch terminals 142B, 144B and 148B are connected to the input of a unity-gain buffer amplifier 149, whose output forms the output of the ramp generator circuit 140.

The CHARGE, DISCHARGE and CLAMP signals from the timing counter circuit 130 control the switches 142, 144 and 148 respectively. Thus, when the CHARGE signal is enabled, the switch 142 allows current from the first current source 141 to be applied to terminal 142B; when the DISCHARGE signal is enabled, the switch 144 allows current from the second current source 143 to be drawn from terminal 144B; and when the CLAMP signal is enabled, the switch 148 connects the point on the resistor ladder intermediate the resistors 146 and 147 to the input of the buffer amplifier 149 such that the initial potential of the capacitor 148 for subsequent charging is reset. It will be understood that in the present example, when typical values of 5 V and 0 V are used for VDD and ground respectively, the ratio of the values of the resistors 146 and 147 results in a potential of 2 V at the point on the resistor ladder intermediate the resistors 146 and 147.

Thus, it will be appreciated that, as can be seen in FIG. 4, the waveform of the ramp signal generated by the timing counter circuit 130 and the ramp generator 140 has:

(i) a first portion (for values of the timing counter 132 from 0 to 3, i.e., of duration 4 clock pulses) during which the signal level is clamped at a potential of 2 V, (ii) a second portion (for values of the timing counter 132 from 4 to hexadecimal 41, i.e., of duration 62 clock pulses) during which the capacitor is charged, and (iii) a third portion (for values of the timing counter 132 from hexadecimal 42 to hexadecimal 7F, i.e., of duration 62 clock pulses) during which the capacitor is discharged.

It will be understood that, since the capacitor 145 is charged and discharged for the same duration and at the same magnitude rate, the ramp form produced is symmetric.

The magnitudes of the charging and discharging currents are chosen so that the peak potential of the ramp signal is equal to that of the DC reference DCREF used in the parabola generator 150.

This symmetric ramp signal is applied to the parabola generator 150 to generate the focusing parabola signal (see FIG. 4) which, after amplification is applied to a CRT to control its horizontal focus.

It will be understood that in the novel parabolic signal generator circuit 100 described above the output parabola (FIG. 3) is delayed hexadecimal 7C clock pulses (which is equivalent to a pre-delay of hexadecimal 7F–7C=3 clock pulses). It will also be understood that the adjustability of the delay provided by the programmable counter circuit 110 allows the circuit 100 to be used with a wide range of external components such as high-voltage amplifiers by allowing the delay produced by the programmable counter circuit 110 to be adjusted to match the particular delay of the external components.

It will also be appreciated that the novel parabolic signal generator circuit 100 described above requires (compared with the prior art circuitry described above in relation to FIG. 1) only a small amount of simple circuitry to generate the focusing parabola waveform (FIG. 4), since a symmetric ramp signal is produced which contains no secondary parabolas requiring blanking. It will therefore be appreciated that the focusing parabola waveform (FIG. 3) produced by the circuit 100 contains little or no spuriae and so can be used to produce sharp scanning lines in the raster and small details in a displayed CRT picture.

The applicant considers all of the following to be subject matter which he regards as his invention or discovery:

(A) A parabolic signal generator for use in a cathode ray tube (CRT) display circuit, comprising:
  programmable delay means for receiving a CRT horizontal flyback signal and for producing a trigger signal which is delayed relative to the horizontal flyback signal by a programmable predetermined time;
  ramp generating means coupled to receive the trigger signal from the programmable delay means for producing a ramp signal in response to the trigger signal;
  parabola generating means coupled to receive the ramp signal from the ramp generating means for producing the parabolic signal.

(B) A parabolic signal generator of paragraph (A) wherein the ramp generating means comprises timer means responsive to the trigger signal for controlling: the duration of a first portion of the ramp signal during which the signal's amplitude remains substantially constant, the duration of a second portion of the ramp signal during which the signal's amplitude increases, and the duration of a third portion of the ramp signal during which the signal's amplitude decreases.

(C) A parabolic signal generator of paragraph (B) wherein the duration of the second portion of the ramp signal and the duration of the third portion of the ramp signal are substantially equal, and the rates of change of the ramp signal's magnitude during the second and third portions are substantially equal, whereby the ramp generating means produces a substantially symmetric ramp signal.

(D) A parabolic signal of paragraph (B) or (C) wherein the ramp generating means comprises:
  capacitor means having a first terminal for connection to a first reference potential and having a second terminal;
  first switch means for connecting a charging current to the second terminal of the capacitor means during the second portion of the ramp signal;
  second switch means for connecting a discharging current to the second terminal of the capacitor means during the third portion of the ramp signal; and
  clamping means for clamping the second terminal of the capacitor means to a predetermined potential during the first portion of the ramp signal.

(E) A parabolic signal of paragraph (A) wherein the parabola generating means produces the parabolic signal from the ramp signal relative to a reference potential, and wherein a peak value of the ramp signal is substantially equal to the reference potential.

(F) A parabolic signal of paragraph (D) or (E) wherein the clamping means comprises: a resistive divider for connection between the first and second reference potentials and having an intermediate point for producing a potential between the first and second reference potentials; and third switch means for connecting the intermediate point of the resistive divider to the second terminal of the capacitor means during the first portion of the ramp signal.

(G) A parabolic signal generator for use in a cathode ray tube (CRT) display circuit, comprising:
  delay means for receiving a CRT horizontal flyback signal and for producing a trigger signal which is delayed relative to the horizontal flyback signal;
  ramp generating means coupled to receive the trigger signal from the programmable delay means for producing a ramp signal in response to the trigger signal; and
  parabola generating means coupled to receive the ramp signal from the ramp generating means for producing the parabolic signal, wherein the ramp generating means is arranged to produce a symmetric ramp signal waveform having a first portion during which the signal's amplitude remains substantially constant, a second portion during which the signal's amplitude increases at a first rate, and a third portion during which the signal's amplitude decreases at a second rate, the durations of the second and third portions being substantially equal and the magnitudes of the first and second rates being substantially equal.

(H) A parabolic signal generator of paragraph (G) wherein the ramp generating means comprises: capacitor means having a first terminal for connection to a first reference potential and having a second terminal; first switch means for connecting a charging current to the second terminal of the capacitor means during the second portion of the ramp signal; second switch means for connecting a discharging current to the second terminal of the capacitor means during the third portion of the ramp signal; and clamping means for clamping the second terminal of the capacitor means to a predetermined potential during the first portion of the ramp signal.

(I) A parabolic signal generator of paragraph (G) wherein the parabola generating means produces the parabolic signal from the ramp signal relative to a reference potential, and wherein a peak value of the ramp signal is substantially equal to the reference potential.

(J) A parabolic signal of paragraph (H) or (I) wherein the clamping means comprises: a resistive divider for connection between the first and second reference potentials and having an intermediate point for producing a potential between the first and second reference potentials; and
  third switch means for connecting the intermediate point of the resistive divider to the second terminal of the capacitor means during the first portion of the ramp signal.

(K) A parabolic signal generator of paragraph (G) wherein the delay means is programmable for producing a trigger signal which is delayed relative to the horizontal flyback signal by a programmable predetermined time.

We claim:

1. A parabolic signal generator for use in a cathode ray tube (CRT) display circuit, comprising:
   programmable delay means for receiving a CRT horizontal flyback signal and for producing an output which is delayed relative to the horizontal flyback signal by a programmable predetermined time;
   ramp generating means coupled to receive the output from the programmable delay means, the ramp generating means for producing a ramp signal in response to the output produced by the programmable delay means, wherein the ramp generating means comprises:
      capacitor means having a first terminal for connection to a first reference potential and having a second terminal;
      first switch means for connecting a charging current to the second terminal of the capacitor means during the second portion of the ramp signal;
      second switch means for connecting a discharging current to the second terminal of the capacitor means during the third portion of the ramp signal; and
      clamping means for clamping the second terminal of the capacitor means to a predetermined potential during the first portion of the ramp signal wherein the clamping means comprises:
         a resistive divider for connection between a first and a second reference potential and having an intermediate point for producing a potential between the first and second reference potentials; and
         third switch means for connecting the intermediate point of the resistive divider to the second terminal of the capacitor means during the first portion of the ramp signal; and
   a timing counter responsive to the output produced by the programmable delay means, the timing counter for controlling:
      the duration of a first portion of the ramp signal during which the signal's amplitude remains substantially constant,
      the duration of a second portion of the ramp signal during which the signal's amplitude increases, and
      the duration of a third portion of the ramp signal during which the signal's amplitude decreases;
      wherein the duration of the second portion of the ramp signal and the duration of the third portion of the ramp signal are substantially equal, and the rates of change of the ramp signal's magnitude during the second and third portions are substantially equal, whereby the ramp generating means produces a substantially symmetric ramp signal;
   parabola generating means coupled to receive the ramp signal from the ramp generating means for producing a parabolic signal.

2. A parabolic signal generator for use in a cathode ray tube (CRT) display circuit, comprising:
   delay means for receiving a CRT horizontal flyback signal and for producing an output, which is delayed relative to the horizontal flyback signal;
   ramp generating means coupled to receive the output signal from the delay means, the ramp generating means for producing a ramp signal in response to the output, wherein the ramp generating means comprises:
      capacitor means having a first terminal for connection to a first reference potential and having a second terminal;
      first switch means for connecting a charging current to the second terminal of a capacitor means during the second portion of the ramp signal;
      second switch means for connecting a discharging current to the second terminal of the capacitor means during the third portion of the ramp signal; and
      clamping means for clamping the second terminal of the capacitor means to a potential on a resistor ladder during the first portion of the ramp signal, wherein the clamping means comprises:
         a resistive divider for connection between the first and a second reference potential and having an intermediate point for producing a potential between the first and second reference potentials; and
         third switch means for connecting the intermediate point of the resistive divider to the second terminal of the capacitor means during the first portion of the ramp signal;
   parabola generating means coupled to receive the ramp signal from the ramp generating means for producing a parabolic signal;
   wherein the ramp generating means is arranged to produce a symmetric ramp signal waveform having a first portion during which the signal's amplitude remains substantially constant, a second portion during which the signal's amplitude increases at a first rate, and a third portion during which the signal's amplitude decreases at a second rate, the durations of the second and third portions being substantially equal and the magnitudes of the first and second rates being substantially equal.

3. A parabolic signal generator for use in a cathode ray tube (CRT) display circuit, comprising:
   programmable delay means for receiving a CRT horizontal flyback signal and for producing an output which is delayed relative to the horizontal flyback signal by a programmable predetermined time;
   a timing counter responsive to the output produced by the programmable delay means, wherein said timing counter provides at least one output signal;
   ramp generating means coupled to receive the at least one output signal from the timing counter for producing a ramp signal, the ramp signal having a first portion, a second portion, and a third portion, in response to the output produced by the programmable delay means, wherein the ramp generating means comprises:
      capacitor means having a first terminal for connection to a first reference potential and having a second terminal;
      first switch means for connecting a charging current to the second terminal of the capacitor means during the second portion of the ramp signal;
      second switch means for connecting a discharging current to said second terminal of the capacitor means during the third portion of the ramp signal; and
      clamping means for clamping the second terminal of the capacitor means to a potential during the first portion of the ramp signal, wherein the clamping means comprises:
         a resistive divider for connection between the first and a second reference potential and having an intermediate point for producing a potential between the first and second reference potentials; and
         third switch means for connecting the intermediate point of the resistive divider to the second terminal of the capacitor means during the first portion of the ramp signal;

parabola generating means coupled to receive the ramp signal from the ramp generating means for producing a parabolic signal, wherein the parabola generating means produces the parabolic signal from the ramp signal relative to a DC reference signal, and wherein a peak value of the ramp signal is substantially equal to the DC reference signal.

4. A parabolic signal generator as claimed in claim 1 wherein the parabola generating means produces a parabolic signal from the ramp signal relative to a reference potential, and wherein a peak value of the ramp signal is substantially equal to the reference potential.

5. A parabolic signal generator as claimed in claim 2 wherein the parabola generating means produces a parabolic signal from the ramp signal relative to a reference potential, and wherein a peak value of the ramp signal is substantially equal to the reference potential.

6. A parabolic signal generator as claimed in claim 1 wherein the duration of the second portion of the ramp signal and the duration of the third portion of the ramp signal are substantially equal, and the rates of change of the ramp signal's magnitude during the second and third portions are substantially equal, whereby the ramp generating means produces a substantially symmetric ramp signal.

7. A parabolic signal generator as claimed in claim 1 wherein one of the reference potentials is ground.

8. A parabolic signal generator as claimed in claim 2 wherein one of the reference potentials is ground.

9. A parabolic signal generator as claimed in claim 3 wherein one of the reference potentials is ground.

10. A parabolic signal generator as claimed in claim 4 wherein one of the reference potentials is ground.

11. A parabolic signal generator as claimed in claim 5 wherein one of the reference potentials is ground.

12. A parabolic signal generator as claimed in claim 6 wherein one of the reference potentials is ground.

* * * * *